United States Patent

Yuda

[11] Patent Number: 6,073,505
[45] Date of Patent: Jun. 13, 2000

[54] LINEAR ACTUATOR, COUPLING AND METHOD

[75] Inventor: Lawrence F. Yuda, Seneca, S.C.

[73] Assignee: CAP Acquisition Corp.

[21] Appl. No.: 09/020,332

[22] Filed: Feb. 6, 1998

[51] Int. Cl.[7] ............................... F16H 25/20; F16D 3/52
[52] U.S. Cl. .................................. 74/89.15; 74/424.8 R; 403/340; 403/372; 464/88
[58] Field of Search ........................ 74/89.15, 424.8 R, 74/459; 403/225, 339, 340, 372; 464/88, 160, 161

[56] References Cited

U.S. PATENT DOCUMENTS

| | | | |
|---|---|---|---|
| 3,057,647 | 10/1962 | Wood | 403/2 |
| 3,298,197 | 1/1967 | Roth | 464/182 |
| 4,352,585 | 10/1982 | Spalding | 403/24 |
| 4,598,238 | 7/1986 | Scarano | 74/424.8 R |
| 5,143,477 | 9/1992 | Kanehira et al. | 403/341 |
| 5,319,991 | 6/1994 | Pierrat | 74/89.15 |
| 5,852,949 | 12/1998 | Cartensen | 74/89.15 X |

*Primary Examiner*—Allan D. Herrmann

[57] ABSTRACT

A coupling includes a sleeve (E) engaged to a lead screw © on one end and to a power take-off shaft from an electric motor (D) on the other end. The lead screw (C) extends into an elongated housing (A) and is threadably received for rotation within a piston (B). An insert (F) is mounted in the sleeve (E) for maintaining respective opposite overlapping ends (G) of the lead screw and the power take-off shaft. The insert is constructed of machinable plastic capable of compensating for slight misalignment while providing resiliency and reduced problems resulting from thermal expansion and contraction of the parts.

17 Claims, 2 Drawing Sheets

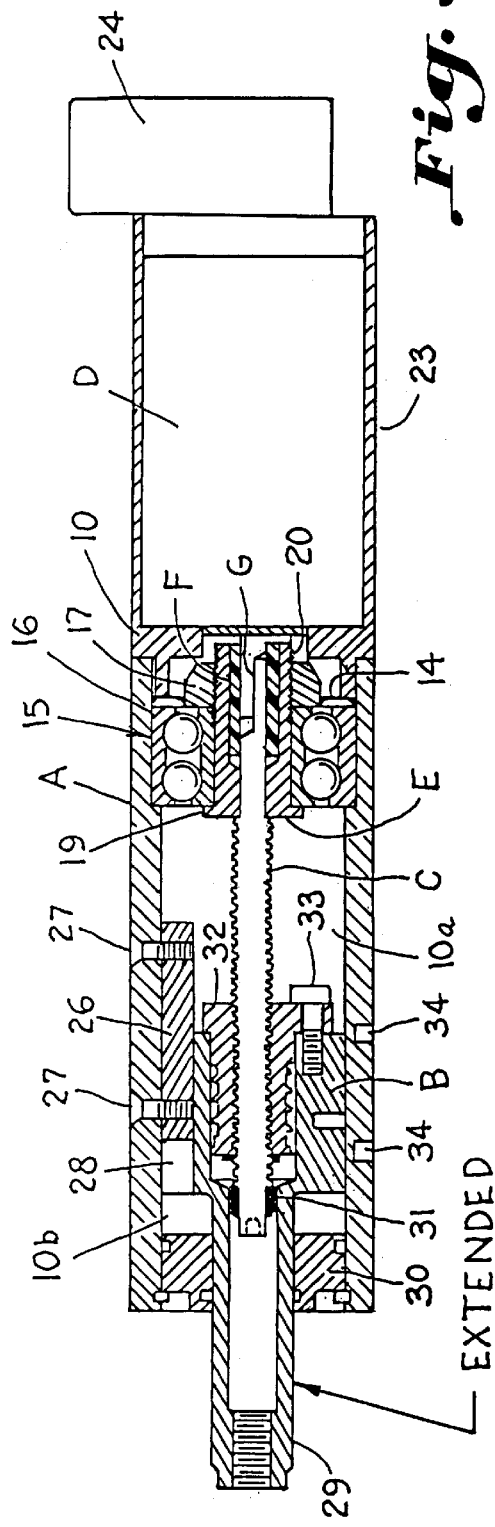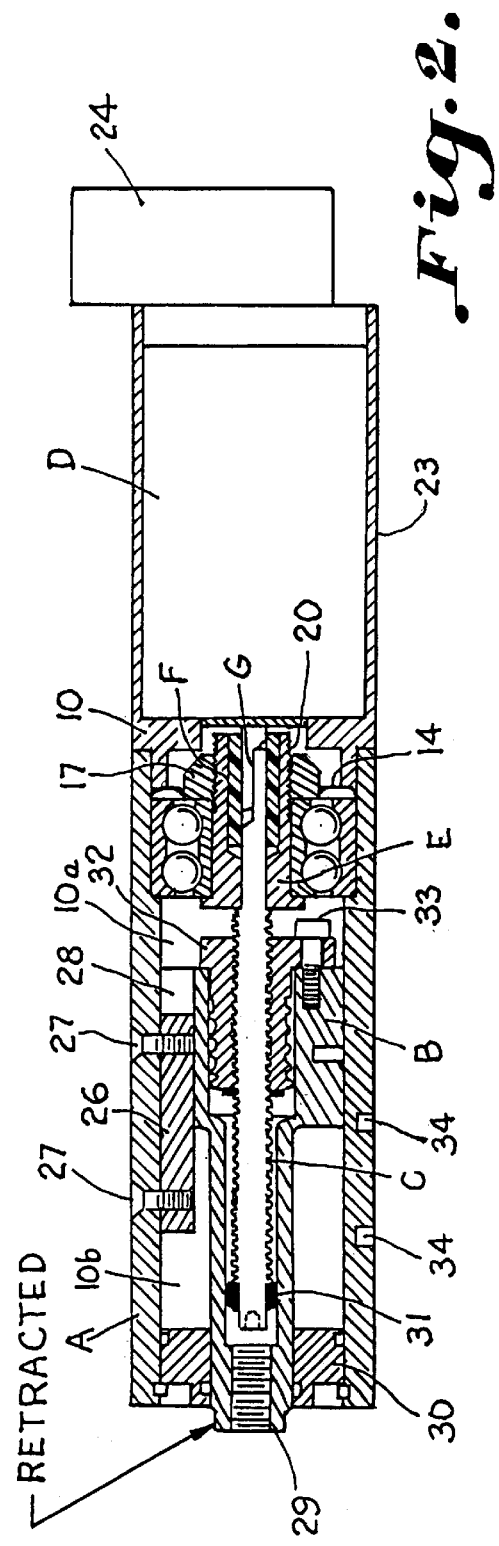

LINEAR ACTUATOR, COUPLING AND METHOD

BACKGROUND OF THE INVENTION

This invention relates to linear actuators including those wherein a motor provides torque to rotate a shaft threadably carried to drive a piston mounted for linear movement within a cylindrical housing, and more particularly to a method of connecting opposed shafts utilizing a special coupling of minimal length.

Linear actuators having motors for driving lead screw arrangements are illustrated in U.S. Pat. Nos. 4,753,071 and 5,577,433. In devices of this kind, for example, connections between a motor shaft and a driven lead screw have heretofore required couplings of substantial length. Another problem is brought about by the need for mounting brackets or plates heretofore required for positioning such a motor housing, coupling apparatus, control components and cylindrical housing carrying an oscillatable piston. It would also be desirable to provide an improved coupling which would minimize the effects of any misalignment of the parts such as a power take-off shaft for transmitting torque to a lead screw threadably carried by a piston and aligned within a cylinder. The effects of misalignment are often compounded by temperature conditions which produce expansion and contraction of elongated components.

Accordingly, it is an important object of this invention to provide a method for connecting aligned shafts utilizing a longitudinal aligned insert preferably constructed of plastic which is preferably machinable. The insert receives overlapping end connections between the shafts. Because the insert is capable of a certain amount of forgiveness or yielding to compensate for misalignment, and may possess a low coefficient of expansion to reduce problems as result from thermal expansion and contraction of the parts a foreshortened coupling is provided which is especially useful in a linear actuator.

SUMMARY OF THE INVENTION

It has been found that an improved linear actuator may be provided utilizing a method and a connection wherein a power take-off shaft from a motor is aligned with parts in overlapping relation to minimize or foreshorten the length of a coupling formed thereby. Components of the coupling may be disconnectably joined with driving and driven parts in overlapping relation to minimize and reduce the length of the coupling while providing compensation for misalignments and temperature induced problems through the use of a plastic sleeve for housing the overlapping parts.

An important object of the invention is to provide a linear actuator which is trim and which is space efficient in respect to length and profile.

Another object of the invention is to provide spaced front and rear bearings to support a lead screw of a linear actuator utilizing a foreshortened coupling therefor.

Another important object of the invention is to provide an anti-rotation guide bar for eliminating rotation of a forwardly extending shaft provided for engaging an external load.

The linear actuator is preferably powered by an electric motor which supplies all of the force for moving an external load as illustrated. While special advantages are achieved through the invention as illustrated and described herein, the invention in its broader aspects may be advantageously utilized when coupling axially aligned shafts in other applications as well as in a linear actuator.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a longitudinal sectional elevation of the linear actuator illustrated in FIG. 1 with the parts in retracted position; and FIG. 3 is a longitudinal sectional elevation similar to FIG. 2 but with the parts in extended position.

DESCRIPTION OF A PREFERRED EMBODIMENT

Figure 1:
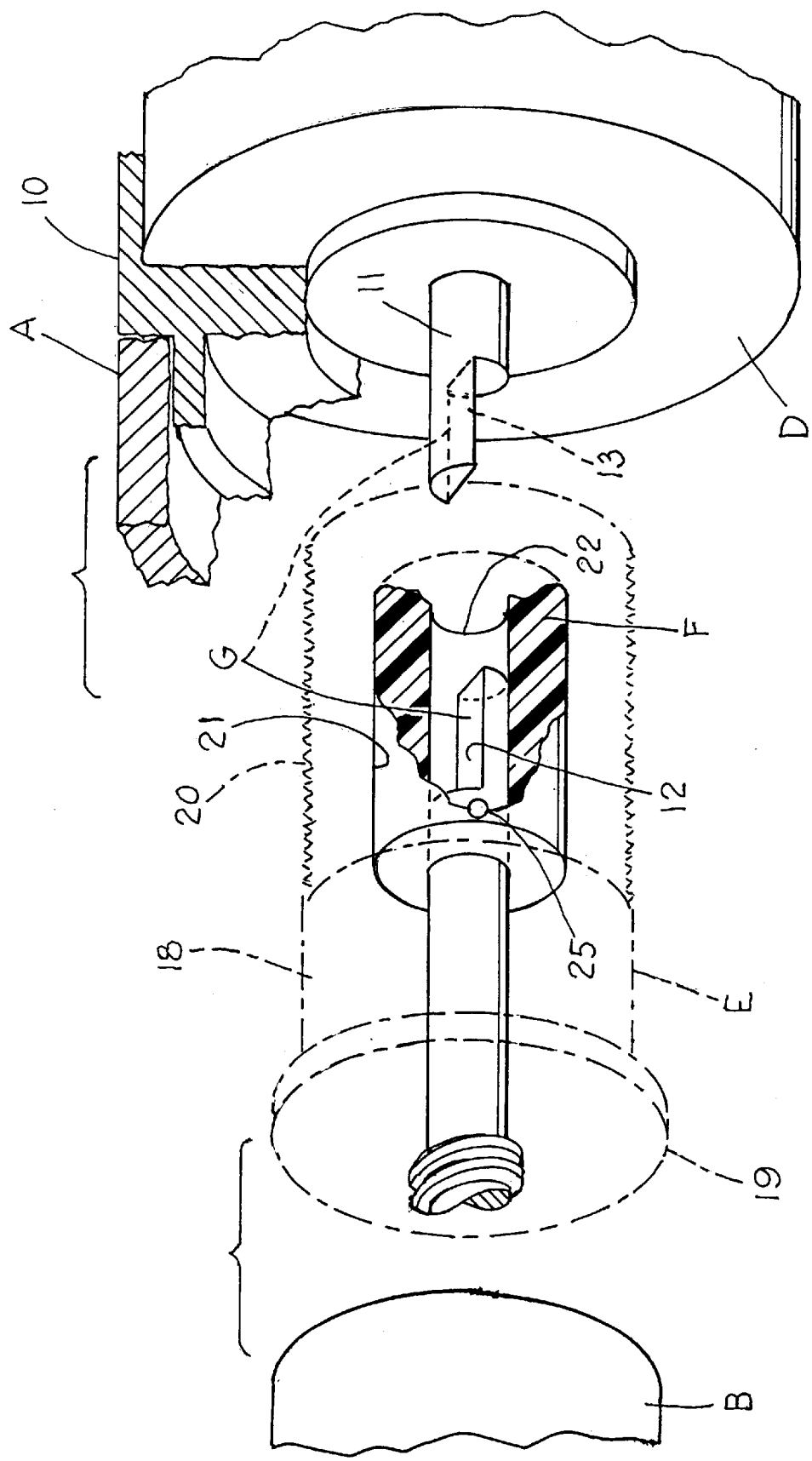
FIG. 1 is a front perspective view, with parts in broken lines and parts broken away, schematically illustrating a linear actuator with foreshortened coupling, including overlapping driving surfaces and method of disconnectably joining same within a plastic insert in accordance with the invention.

The drawings illustrate a linear actuator and method for moving an eternal load. An elongated housing A is separated into longitudinally spaced chambers 10 *a* and 10 *b* by a piston B. An aligned shaft such as a lead screw C extends into the housing where it is threadably received by the piston for rotation about a longitudinal axis. An element, illustrated in the form of a shaft, is carried by the piston for reciprocal motion therewith for engagement with the load. A motor D has a power take-off shaft engaged to the lead screw for selectively providing torque to urge the lead screw toward clockwise and counterclockwise rotation for aiding in driving the piston and the load. A coupling between the power take-off shaft and the lead screw includes a sleeve E engaged to the lead screw on one end and to the power take-off shaft on the other end. An insert F in the sleeve receives and maintains respective opposited ends G of the lead screw and the power take-off shaft in overlapping driving relation for transferring torque therebetween.

The insert F is preferably constructed of plastic which is capable of providing a somewhat forgiving or yielding connection, and which preferably exhibits at least some resilience so as to compensate for slight misalignments of the respective shafts while relieving adverse effects of thermal expansions and contractions of the parts. Preferably a machinable plastic such as Ertalyte, PET, Product of AiN PLASTICS is used to construct the insert.

Referring more particularly to the drawings, FIG. 1 is a perspective view illustrating the coupling for securing an electric motor D to a lead screw C for threadable reception by a piston B for transmitting torque and a driving force to the piston.

A motor mounting flange 10 is suitably connected to an adjacent end of the cylindrical housing A. The housing A contains a coupling for efficiently and with minimal length drivingly connecting a means for providing torque in the form of a power take-off shaft 11 from the electric motor D to the lead screw C and thence to the piston B. The coupling includes a sleeve E carrying the insert F. The opposite overlapping ends G of the lead screw and power take-off shaft include drive surfaces illustrated at 12 and 13, respectively. The opposite surfaces 12 and 13 are in overlapping aligned relation and are symmetrically carried about a longitudinal axis which is aligned with the lead screw and the power take-off shaft 11 serving as a means for providing torque to the lead screw C. The piston B threadably receives the lead screw C and this is illustrated in greater detail in FIGS. 2 and 3. FIG. 2 illustrates the parts in retracted position while FIG. 3 illustrates the linear actuator shaft in extended position. A wave spring 14 is used to maintain the angular contact bearing broadly designated as at 15 in position within a groove 16 in an end of the cylinder A adjacent the motor D. A nut 17 confines the bearing 15 in position upon a receiving end 18 of the sleeve E against a flange 19 carried by the sleeve. The sleeve has a threaded exterior 20 on its other end opposite the insert F. The insert is suitably fixedly secured within the recess 21 formed by a bore within the sleeve by press fitting and preferably utilizing a suitable adhesive. The opposed flats or overlapping aligned surfaces 12 and 13, respectively, are contained within a receptacle preferably in the form of a bore 22 within the insert F and pressed therein to avoid rotation. The ends carrying the flat surfaces 12 and 13 may be withdrawn as in FIG. 1 so as to separate the cylinder A and its related components from the motor D with its mounting flange 10. The motor mounting flange 10 is illustrated as being connected to a motor housing 23 (FIG. 2) and a suitable optical encoder 24 may be mounted in any desirable fashion upon the motor housing 23.

The wave springs 14 may be provided in pairs affording a dampening effect to any impact forces encountered by the linear actuator in operation. The plastic insert F is held into the sleeve for resisting forces tending to rotate the insert in respect to the sleeve. This function of the insert is incidental to its purpose of binding the two shafts together. The sleeve E carries the lead screw on one end next adjacent the opposed flats G by means of a suitable mechanical fastening means which may include a pin 25, shown schematically in FIG. 1, and an interference fit between the lead screw C and the insert F.

Referring again to FIGS. 2 and 3 an anti-rotation guide bar 26 is suitably secured by screws 27 within the cylindrical housing A. The anti-rotation guide bar is carried within an elongated longitudinal slot 28 on the piston B. The piston B has a forwardly extending linear actuator shaft 29 for engaging an external load (not shown). The shaft passes through a suitable end bell 30 on the cylindrical housing. The shaft receives a bronze bushing 31 for rotatably mounting an end of the lead screw C. An internally threaded member, preferably a suitable anti-back lash nut 32 is secured within a bore within the piston. Anti-back lash nuts such as those of the Kerk ZBX series provided by Kerk Motion Products may be utilized. The anti-back lash nut is suitably secured by a screw 33 to the piston B.

Suitable longitudinally spaced receptacles 34 are provided for receiving mounting screws and the like (not shown), for positioning the linear actuator. The cylindrical housing can thus be mounted in a manner similar to a standard type cylinder without special bracket for separately mounting the motor and associated mechanical and electrical components.

In operation, the motor provides torque to rotate the lead screw C in a clockwise or counterclockwise direction. Motor rotation is transferred through linear motion through an anti-back lash nut 32 which is illustrated as integrally attached to the shaft 29. The anti-rotation guide bar 26 eliminates any shaft rotation as the shaft 29 to act upon an external load. The position of the power take-off shaft 11 is constantly monitored as by a suitable optical encoder 24 for creating discrete electrical signals that are interpreted by a suitable motion control device (not shown).

While a preferred embodiment of the invention has been described using specific terms, such description is for illustrative purposes only, and it is to be understood that changes and variations may be made without departing from the spirit or scope of the following claims.

What is claimed is:

1. A coupling for connecting a motor having an axial power take-off shaft including a first aligned driving surface for imparting rotary motion to an aligned member having a second aligned driving surface comprising:
   a sleeve having an aligned internal cavity receiving said first and second aligned driving surface of said power take-off shaft and said aligned member;
   an insert received into said cavity for resisting forces tending to rotate said insert in respect to said bearing sleeve; and
   said insert having a receptacle therein for receiving said ends of said shafts and engaging said ends against rotation in respect to said insert;
   whereby a coupling of reduced length transmitting axial torque is disengageable in response to opposed forces for axially removing the motor from the aligned member.

2. The coupling set forth in claim 1 including a flange carried at a forward end of said sleeve, and a nut carried in axially spaced relation to said flange for receiving a bearing therebetween carrying the sleeve for rotation.

3. The coupling set forth in claim 2 including screw threads carried by said aligned shaft forming a lead screw for driving a load engaging member.

4. The coupling set forth in claim 3 wherein said first and second shafts are circular having longitudinal opposed flats for reception in a machined bore in said insert.

5. The coupling set forth in claim 4 wherein said insert is constructed of Ertalyte.

6. A linear actuator for moving a load comprising:
   an elongated housing;
   a piston separating said housing into longitudinally spaced chambers;
   a lead screw carried for rotation and extending into said chambers for rotation about a longitudinal axis thereof and threadably received by said piston;
   a shaft carried by the piston for reciprocal motion therewith and extending through said housing for engagement with the load;
   a motor having a power take off shaft for selectively providing torque to urge said lead screw toward clockwise and counterclockwise rotation thereof for aiding in driving said piston and the load;
   a coupling including a sleeve for engagement by said lead screw on one end and by said motor on the other;
   a cavity in said insert;
   a first aligned driving surface on said power take off shaft:
   a second aligned driving surface on said lead screw; and
   an insert in said cavity in said sleeve having a receptacle for receiving the ends of said shafts.

7. The linear actuator set forth in claim 6 including an internally threaded member rotatably supporting said lead screw.

8. The structure set forth in claim 7 including an internally threaded sleeve carrying said lead screw at an end opposite the piston.

9. The linear actuator set forth in claim 6 including self-locking threads on said lead screw and said internally threaded member.

10. The linear actuator set forth in claim 9 wherein said housing is a cylinder; and mounting means carried by said cylinder.

11. The linear actuator set forth in claim 6 wherein the ends of said shafts are received in the insert in overlapping driving relation.

12. The linear actuator set forth in claim 11 wherein said insert is constructed of yieldable plastic for relieving slight misalignments.

13. A coupling for connecting a motor having an axial power take-off shaft including a first aligned driving surface for imparting rotary motion to an aligned member having a second aligned driving surface in opposed relation to said first aligned driving surface comprising:

a sleeve having an aligned internal cavity receiving said opposed aligned driving surfaces of said power take-off shaft and said aligned member in overlapping relation;

an insert constructed of plastic received into said cavity for resisting forces tending to rotate said insert in respect to said sleeve; and said insert having a bore therein for receiving said driving surfaces and engaging said power take-off shaft and said aligned member against rotation in respect to said insert;

whereby said coupling transmits axial torque through said overlapping ends and may be disengageable in said plastic in response to opposed forces for axially removing said motor while compensating for slight misalignment of parts and temperature expansions and contractions.

14. A method of connecting a motor having an axial power take-off shaft carrying a first aligned driving surface for imparting rotary motion to an aligned shaft having a second aligned driving surface in opposed relation to said first aligned driving surface comprising the steps of:

providing a sleeve with an aligned internal cavity for receiving the opposed aligned driving surfaces of the power take-off shaft and said aligned shaft in overlapping relation;

mounting an insert constructed of plastic into said cavity for resisting forces tending to rotate the insert in respect to the sleeve;

forming a bore in said insert; and positioning overlapping ends of said shafts in said bore within said plastic insert engaging said ends against rotation in respect to said insert;

whereby a coupling of minimal length transmits axial torque through overlapping ends within said plastic insert and which may be disengageable in response to opposed forces for axially removing said motor while compensating for misalignments and temperature induced problems.

15. The method set forth in claim 14 including the steps of providing a flange and a bearing positioning said sleeve for rotation within a cylindrical housing.

16. The method set forth in claim 15 including the step of machining said insert from plastic.

17. The method set forth in claim 16 wherein said first shaft is a power take-off shaft and said second shaft is a threaded lead screw.

* * * * *